United States Patent [19]
Grabowski et al.

[11] Patent Number: 4,584,279
[45] Date of Patent: Apr. 22, 1986

[54] OPTICAL GLASS WITH REFRACTIVE INDICES>1.90, ABBE NUMBERS>25 AND HIGH CHEMICAL STABILITY

[75] Inventors: Danuta Grabowski, Wiesbaden; Ludwig Ross, Klein-Winternheim; Volkmar Geiler, Mainz-Finthen; Karl Mennemann, Taunusstein; Georg Gliemeroth, Mainz-Finten, all of Fed. Rep. of Germany

[73] Assignee: Schott Glaswerke, Mainz, Fed. Rep. of Germany

[21] Appl. No.: 673,317

[22] Filed: Nov. 20, 1984

[30] Foreign Application Priority Data

Dec. 1, 1983 [DE] Fed. Rep. of Germany ....... 3343418

[51] Int. Cl.$^4$ .................. C03C 3/068; C03C 4/00
[52] U.S. Cl. ...................................... 501/78; 501/901
[58] Field of Search ............................ 501/51, 42–45, 501/78, 901

[56] References Cited

U.S. PATENT DOCUMENTS

| | | | |
|---|---|---|---|
| 3,958,999 | 5/1976 | Izumitani et al. | 501/78 |
| 4,118,238 | 10/1978 | Ishibashi et al. | 501/901 |
| 4,120,732 | 10/1978 | Komorita et al. | 501/78 |
| 4,166,746 | 9/1979 | Ishibashi et al. | 501/51 |
| 4,439,531 | 3/1984 | Mennemann et al. | 501/901 |
| 4,472,511 | 9/1984 | Mennemann et al. | 501/78 |

FOREIGN PATENT DOCUMENTS

56-78447  6/1981  Japan ................................ 501/901

*Primary Examiner*—Mark L. Bell
*Attorney, Agent, or Firm*—Millen & White

[57] ABSTRACT

Optical glass with refractive indicies $\geq 1.90$, Abbe numbers $\geq 25$ consisting essentially of, in weight percent; 0–10 $SiO_2$, 2–20 $B_2O_3$, 0–2 $Al_2O_3$, the sum of $SiO_2$, $B_2O_3$, and $Al_2O_3$ being 7.5–25, 1–16 $TiO_2$, 0–10 $ZrO_2$, 35–55 $La_2O_3$, 0.5–10 $Y_2O_5$, 0.5–15 $Nb_2O_5$, 0–10 $Gd_2O_3$, 0–15 $Ta_2O_5$, 0–3 $P_2O_5$ wherein the ratio of $SiO_2$ to $B_2O_3$ is between 0.1 and 1.6, and the sum of $Nb_2O_5$ and $Ta_2O_5$ is from 9 to 20%.

19 Claims, No Drawings

OPTICAL GLASS WITH REFRACTIVE INDICES >1.90, ABBE NUMBERS >25 AND HIGH CHEMICAL STABILITY

BACKGROUND OF THE INVENTION

This invention relates to the field of optical glass.

It is the aim of the invention to find a composition range for optical glass which allows high- and super-refractive optical glasses (nd>1.90) with relatively low disperson (vd>25), high chemical stability and high crystallization stability to be produced so that castings of major dimensions (for example 200×200×100 mm) can be cast in good optical quality, that is to say largely free of bubbles, optical inhomogenities (schlieren) and crystals. Besides satisfying these primary requirements the glasses according to the invention also satisfy the demand for high and uniform transmission over a wide spectral range of 500 to 2400 nm.

The $Yb_2O_3$-containing glasses which are described in JPOS 57 38 342 do not satisfy the demand for good transmission. They show very strong absorption at wavelengths of about 900 nm The current state of the art is described in several patents. JPOS 79 133 506 describes glasses with an nd ≦1.95 and an Abbe number in the region of 33-39, and where, with increasing nd it is also necessary to increase the $GeO_2$ content in order to obtain adequately stable glasses so that the price of the frit is substantially increased.

Glasses with refractive indices ≦1.95 and similar Abbe numbers are also described in JPOS 79 790 218 and in JPOS 79 103 411 and these contain with increasing refractive index numbers an increasing amount of $WO_3$ and of the extremely expensive $GeO_2$ in order to achieve adequate crystallization stability.

Production of a glass having the refractive index >1.95 is however possible only within the composition range of J 29 42 038 (nd <1.97) and of German Patent Application dated 30.7.1981 DE-OS 31 30 039. The glasses according to the first mentioned Specification are characterised in that they either have too great a tendency towards crystallization in the presence of $SiO_2$, forming the heavy-metal salts of the complex anions $[Si(W_{12}O_{40})]^{4-}$, or, if $SiO_2$ is omitted, have much poorer chemical stability. Besides, these glasses require up to 35% by weight $WO_3$ and up to 31% by weight of the very expensive $Ta_2O_5$ in order to achieve the high refractive indices. Whilst the glasses described in German Patent Application DE-OS 31 30 039 have a refractive index >2.0 and Abbe numbers in the range 25-43, they can only be used for making small castings in which rapid cooling of the glass mass is assured because of their crystallization behaviour.

The very high refractive indices can here be achieved only with increasing amounts of very expensive $Ta_2O_5$ (up to 20% by weight) and additions of PbO and $TiO_2$ (up to 13% by weight), which in turn has a marked negative influence on the transmissivity of the glass.

The optimum ratio of $SiO_2B_2O_3=1.3-1.9$ specified in DE-OS 31 30 039 does not agree with that which has been found in the system according to the present invention.

SUMMARY OF THE INVENTION

In its broad aspect, the present invention provides optical glass with refractive indices ≧1.90, Abbe numbers ≧25 and particualarly good chemical stability (erosion times for 1 μm from a polished surface of 0.5 n $HNO_3$ more than 50 hours) as well as high crystallization stability in the viscosity range <100 dPas, characterized by the following composition (in percent, by weight):

| | |
|---|---|
| $SiO_2$ | 0-10 |
| $B_2O_3$ | 2-20 |
| $Al_2O_3$ | 0-2 |
| $SiO_2, B_2O_3, Al_2O_3$ | 7.5-25 |
| $TiO_2$ | 1-16 |
| $ZrO_2$ | 0-10 |
| $La_2O_3$ | 35-55 |
| $Y_2O_3$ | 0.5-10 |
| $Nb_2O_5$ | 0.5-15 |
| $Gd_2O_3$ | 0-10 |
| $Ta_2O_5$ | 0-15 |
| $P_2O_5$ | 0-3. |

The glasses according to the invention are mainly within the system $SiO_2$-$B_2O_3$-$La_2O_3$-$Y_2O_3$-$TiO_2$-$Nb_2O_5$-$Gd_2O_3$. The $SiO_2/B_2O_3$-ratio comprises a range of o.1 to 1.6 preferably. For obtaining the high refractive indices >1.90 it is necessary to use 35-55% b.w. $La_2O_3$ as well as 0.5-10% b.w. $Y_2O_3$, as well as 10-16% b.w. $TiO_2$ and also 1.5-13% b.w. $Mb_2O_5$ as well as 0-10% b.w. $Gd_2O_3$. Optionally 0-15% b.w. (MO=CaO, SrO, BaO, ZnO, PbO),0-15% b.w. $Ta_2O_5$ and 0-2% b.w. $Yb_2O_3$ may also be used. BaO and PbO may be replaced by ZnO, SrO, CaO. The sum of $Nb_2O_5$ and $Ta_2O_5$ is from 9 to 20% by weight. $La_2O_3$ may be wholly or partly substituted by other rare earth oxides and in that the sum of rare earth oxides from 30 to 55% by weight.

A percentage from 0-8% b.w. of $ZrO_2$ is desirable in the system. Further possible are 0-2% b.w. $SnO_2$, 0-4% b.w. $F^-$, 0-2% b.w. BaO, 0-10% b.w. $Bi_2O_3$, 0-3% b.w. $WO_3$ and 0-2% b.w. $CeO_2$.

The essential feature of the glasses according to this invention resides in that within the above mentioned glass system it is possible to produce crystallization-stable, chemically resistent, high-and super high-refractive glasses with good transmission and of good optical quality.

EXAMPLES

Table 1 shows 16 examples in the preferred composition range.

The glasses according to the invention are produced as follows:

The raw materials (oxides, carbonates, nitrates, fluorides) are weighed out, a refining medium such as $As_2O_3$ in amounts of 0.1 to 1% by weight, is added and the whole well mixed. The frit is then melted down at about 1350° to 1450° C. in a ceramic or platium crucible, refined at 1500° to 1550° C. and well homogenized by means of stirring equipment. At a casting or pouring temperature of approximately 1350° C. and a viscosity of about 10 dPas the glass is poured into metal moulds.

| Sample Melt for 1000 kg calculated glass | | | |
|---|---|---|---|
| Oxide | % b.w. | raw maierial | weighed quantity (kg) |
| $SiO_2$ | 4.50 | Sipur | 45.09 |
| $B_2O_3$ | 10.0 | $H_3BO_3$ | 177.30 |
| $La_2O_3$ | 35.0 | $La_2O_3$ | 353.22 |
| $Y_2O_3$ | 10.0 | $Y_2O_3$ | 101.01 |

-continued

| Sample Melt for 1000 kg calculated glass | | | |
|---|---|---|---|
| Oxide | % b.w. | raw material | weighed quantity (kg) |
| Gd$_2$O$_3$ | 7.60 | Gd$_2$O$_3$ | 76.00 |
| TiO$_2$ | 15.80 | TiO$_2$ | 158.15 |
| ZrO$_2$ | 7.50 | ZrO$_2$ | 75.25 |
| Nb$_2$O$_5$ | 9.50 | Nb$_2$O$_5$ | 95.04 |
| | | | 1081.06 |
| | | As$_2$O$_3$ | 1.00 refining agent |
| | | | 1082.05 kg frit |

The properties of this glass are specified in example 9, Table 1.

TABLE 1

| | 1 | 2 | 3 | 4 | 5 | 6 | 7 | 8 |
|---|---|---|---|---|---|---|---|---|
| SiO$_2$ | 8,50 | 2,50 | 8,50 | 8,50 | 6,50 | 7,50 | 4,50 | 5,50 |
| B$_2$O$_3$ | 13,00 | 19,00 | 11,00 | 10,00 | 5,00 | 5,00 | 6,00 | 5,00 |
| La$_2$O$_3$ | 38,00 | 38,00 | 38,00 | 38,00 | 48,00 | 49,50 | 53,00 | 48,00 |
| Y$_2$O$_3$ | 6,50 | 6,50 | 6,50 | 6,50 | 6,50 | 0,50 | 8,50 | 8,10 |
| Gd$_2$O$_3$ | 7,60 | 7,60 | 7,60 | 7,60 | 7,60 | 4,00 | | |
| TiO$_2$ | 10,50 | 10,50 | 12,50 | 12,50 | 10,50 | 6,20 | 4,10 | 10,50 |
| ZrO$_2$ | 6,40 | 6,40 | 6,40 | 6,40 | 6,40 | 3,60 | 6,40 | 6,40 |
| Ta$_2$O$_5$ | | | | | | 11,00 | 3,40 | 14,00 |
| Nb$_2$O$_5$ | 9,50 | 9,50 | 9,50 | 10,50 | 9,50 | 9,00 | 13,00 | 1,50 |
| PbO | | | | | | 3,60 | | |
| BaO | | | | | | | | |
| Bi$_2$O$_3$ | | | | | | | | |
| Al$_2$O$_3$ | | | | | | | | |
| As$_2$O$_3$ | 0,10 | 0,10 | 0,10 | 0,10 | 0,20 | 0,10 | 0,20 | 0,20 |
| SnO$_2$ | | | | | | | | |
| P$_2$O$_5$ | | | | | | | 1,00 | 1,00 |
| F | | | | | 1,50 | | | |
| n$_d$ | 1.9178 | 1.9230 | 1.9463 | 1.9575 | 1.9908 | 1.9920 | 1.9930 | 1.9980 |
| v$_d$ | 34,40 | 31,50 | 30,00 | 29,5 | 30,3 | 30,4 | 30,8 | 30,5 |
| (g/cm$^3$) | 4,67 | 4,57 | 4,78 | 4,83 | 5,30 | 5,35 | 5,25 | 5,19 |
| τi 700 nm/ 25 nm | 0,79 | 0,78 | 0,79 | 0,78 | 0,75 | 0,70 | 0,72 | 0,74 |
| SiO$_2$/B$_2$O$_3$ | 0,65 | 0,13 | 0,77 | 0,85 | 1,30 | 1,50 | 0,75 | 1,10 |

| | 9 | 10 | 11 | 12 | 13 | 14 | 15 | 16 |
|---|---|---|---|---|---|---|---|---|
| SiO$_2$ | 4,50 | 6,50 | 4,50 | 5,50 | 2,50 | 6,50 | 6,00 | 4,50 |
| B$_2$O$_3$ | 10,00 | 4,50 | 6,00 | 5,00 | 5,00 | 5,00 | 5,00 | 6,80 |
| La$_2$O$_3$ | 35,00 | 44,00 | 53,00 | 48,00 | 48,00 | 48,00 | 48,00 | 42,10 |
| Y$_2$O$_3$ | 10,00 | 9,70 | 8,50 | 8,10 | 5,60 | 0,50 | 0,50 | 10,00 |
| Gd$_2$O$_3$ | 7,60 | | | | 7,60 | 7,60 | 7,60 | 10,00 |
| TiO$_2$ | 15,80 | 10,00 | 10,50 | 10,50 | 10,00 | 10,50 | 10,50 | 10,50 |
| ZrO$_2$ | 7,50 | 6,50 | | 6,40 | 8,50 | 6,40 | 6,40 | 6,40 |
| Ta$_2$O$_5$ | | 6,00 | 3,40 | 6,00 | 4,20 | 6,00 | 6,00 | |
| Nb$_2$O$_5$ | 9,50 | 9,10 | 13,00 | 9,50 | 6,90 | 9,50 | 9,50 | 9,50 |
| PbO | | | | | | | | |
| BaO | | 2,00 | | | | | | |
| Bi$_2$O$_3$ | | 1,50 | | | | | | |
| Al$_2$O$_3$ | | | | | 1,50 | | | |
| As$_2$O$_3$ | 0,10 | 0,20 | 0,20 | 0,20 | 0,20 | 0,40 | 0,20 | 0,20 |
| SnO$_2$ | | | | | | | 0,50 | |
| P$_2$O$_5$ | | | 1,00 | 1,00 | | | | |
| F | | | | | | | | |
| n$_d$ | 2.0041 | 2.011 | 2.0156 | 2.0157 | 2.0145 | 0.0214 | 2.025 | 2.0233 |
| v$_d$ | 27,5 | 29,2 | 28,7 | 28,9 | 29,20 | 20,06 | 28,8 | 28,0 |
| (g/cm$^3$) | 4,98 | 5,05 | 5,30 | 5,40 | 4,95 | 5,40 | 5,38 | 5,30 |
| τi 700 nm/ 25 nm | 0,80 | 0,78 | 0,80 | 0,81 | 0,77 | 0,80 | 0,80 | 0,79 |
| SiO$_2$/B$_2$O$_3$ | 0,45 | 1,44 | 0,75 | 1,10 | 0,50 | 1,30 | 1,20 | 0,90 |

We claim:

1. Optical glass with refractive indices ≧1.90, Abbe numbers ≧25 and particularly good chemical stability (erosion times for 1 um from a polished surface by 0.5 n HNO$_3$ more than 50 hours) as well as high crystallization stability in the viscosity range <100 dPas, consisting essentially of, in percent by weight:

| SiO$_2$ | 0-10 |
|---|---|
| B$_2$O$_3$ | 2-20 |
| Al$_2$O$_3$ | 0-2 |
| Σ SiO$_2$, B$_2$O$_3$, Al$_2$O$_3$ | 7.5-25 |
| TiO$_2$ | 1-16 |
| ZrO$_2$ | 0-10 |
| La$_2$O$_3$ | 35-55 |
| Y$_2$O$_3$ | 0.5-10 |
| Nb$_2$O$_5$ | 0.5-15 |
| Gd$_2$O$_3$ | 0-10 |
| Ta$_2$O$_5$ | 0-15 |
| P$_2$O$_5$ | 0-3 | wherein the ratio of SiO$_2$ to B$_2$O$_3$ is between 0.1 and 1.6, and the sum of Nb$_2$O$_5$ Ta$_2$O$_5$ is from 9 to 20% by weight.

2. Glass according to claim 1, characterised by the following composition (in percent. by weight):

| SiO$_2$ | 0.5-10 |
|---|---|
| B$_2$O$_3$ | 2-20 |
| Al$_2$O$_3$ | 0-1.5 |
| GeO$_2$ | 0-2.0 |
| Σ SiO$_2$, GeO$_2$, B$_2$O$_3$, Al$_2$O$_3$ | 7.5-25 |
| TiO$_2$ | 10-16 |
| ZrO$_2$ | 0-8 |

-continued

| | |
|---|---|
| La$_2$O$_3$ | 35–55 |
| Y$_2$O$_3$ | 0.5–10 |
| Nb$_2$O$_5$ | 1.5–13 |
| Ta$_2$O$_5$ | 0–10 |
| P$_2$O$_5$ | 0–2 |
| Gd$_2$O$_5$ | 0–10. |

3. Glass according to claim 1, characterised in that it contains from 0 to 10% by weight of Bi$_2$O$_3$.

4. Glass according to claim 1, characterised in that it contains from 0 to 2% by weight of SnO$_2$.

5. Glass according to claim 1, characterised in that it contains from 0 to 4% by weight of F$^-$.

6. Glass according to claim 1, characterised in that it contains 0 to 15% by weight of MO (MO=CaO, SrO, BaO, ZnO, PbO).

7. Glass according to claim 1, characterised in that it contains from 0 to 2% by weight of Yb$_2$O$_3$.

8. Glass according to claim 1, characterised in that La$_2$O$_3$ is wholly or partly substituted by other rare oxides and in that the sum of rare earth oxides is from 30 and 55% by weight.

9. Glass according to claim 1, characterised in that it contains from 0 to 2% by weight CeO$_2$.

10. Glass according to claim 1, characterised in that it contains from 0 to 3 by weight WO$_3$.

11. Glass according to claim 2, characterised in that it contains from 0 to 10% by weight of Bi$_2$O$_3$.

12. Glass according to claim 2, characterized in that it contains from 0 to 2% by weight of SnO$_2$.

13. Glass according to claim 2, characterized in that it contains from 0 to 4% by weight of F$^-$.

14. Glass according to claim 2, characterized in that it contains from 0 to 15% by weight of MO (MO=CaO, SrO, BaO, ZnO, PbO).

15. Glass according to claim 2, characterized in that it contains from 0 to 2% by weight of Yb$_2$O$_3$.

16. Glass according to claim 2, characterized in that La$_2$O$_3$ is wholly or partly substituted by other rare earth oxides and in that the sum of rare earth oxides is from 30 to 55% by weight.

17. Glass according to claim 2, characterized in that it contains from 0 to 2% by weight CeO$_2$.

18. Glass according to claim 2, characterized in that it contains from 0 to 3% by weight WO$_3$.

19. Glass according to claim 1 having a refractive index of at least 1.923.

* * * * *